United States Patent [19]
Thomas

[11] Patent Number: 5,845,001
[45] Date of Patent: Dec. 1, 1998

[54] METHOD AND APPARATUS FOR GENERATING UNIQUE CHARACTERIZATION DATA FOR PAINTINGS

[76] Inventor: Thomas N. Thomas, 5135 N. 43rd Pl., Phoenix, Ariz. 85018

[21] Appl. No.: 752,645

[22] Filed: Nov. 19, 1996

[51] Int. Cl.⁶ .................................................. G06K 9/64
[52] U.S. Cl. .......................................... 382/100; 382/217
[58] Field of Search ..................... 382/112, 113, 382/100, 217, 218, 135, 294, 209; 356/71, 388, 390, 394; 283/72; 340/825.3, 825.34

[56] References Cited

U.S. PATENT DOCUMENTS

| | | | |
|---|---|---|---|
| 5,005,147 | 4/1991 | Krishen et al. | 364/578 |
| 5,243,405 | 9/1993 | Tichenor et al. | 356/371 |
| 5,521,984 | 5/1996 | Deunberg et al. | 382/100 |
| 5,662,109 | 9/1997 | Hutson | 128/653.1 |

FOREIGN PATENT DOCUMENTS 1 357 734   6/1974   United Kingdom .

OTHER PUBLICATIONS

Schmid et al. "Combining greyvalue invariants with local constraints for object recognition." Proc. of IEEE Conf. on Computer Vision and Pattern Recognition, pp. 872–877, Jun. 1996.

Eastaugh. "Examination of Paintings by Infrared and other Techniques." IEEE Colloguium on Novel Display Technologies, pp. 611–613, May 1995.

*Primary Examiner*—Jon Chang
*Attorney, Agent, or Firm*—Tod R. Nissle, P.C.

[57] ABSTRACT

A non destructive method and apparatus generates unique characterization data for a painting. The method and apparatus spatially correleates points in a photograph of the painting with data defining a physical property of the viewing surface or of the internal structure of the painting.

3 Claims, 2 Drawing Sheets

METHOD AND APPARATUS FOR GENERATING UNIQUE CHARACTERIZATION DATA FOR PAINTINGS

BACKGROUND OF THE INVENTION

1. Field of the Invention

This invention relates to an apparatus and method for authenticating paintings.

In a further respect, the invention relates to a nondestructive method and apparatus for generating unique characterization data for paintings.

2. Description of the Related Art Including Information Disclosed under 37 CFR 1.97–1.99.

Various methods and apparatus for authenticating paintings are known. Some basic simple techniques for evaluating the provenance of a particular painting include the subject matter of the painting, the shape and dimension and frequency of brush stroke striations, the thickness of and layers in paint, and the presence of overpainting. Other nondestructive, semidestructive, and destructive technical methods have evolved for evaluating the physical properties (including the chemical composition) of paint samples and paintings.

Nondestructive techniques for evaluating paint includes visible light examinations with magnification and filters, infrared examinations with infrared photography or with infrared luminescence, ultraviolet examinations, x-ray examinations with medical range x-rays (35–85 KV) or with soft x-rays (Grenz rays (7–12 KV), and derivative radiation techniques. The derivation radiation techniques include X-ray diffraction analysis, reflection spectrophotometry, multiple reflection infrared spectrophotometry, nondestructive neutron activation analysis, and electron microprobe analysis.

Semidestructive testing procedures are performed on ground up paint samples so that the samples can, after being tested, be further examined with nondestructive or destructive test procedures. Semidestructive techniques include infrared spectrophotometry, density gradient techniques, and microscopic examinations. The microscopic examinations determine particle dispersion, particle size, inclusions, refractive index, birefringence and pleochroism.

Destructive testing procedures which do not require dissolving paint include pyrolysis-gas chromatography, differential thermal analysis, and emission spectrography.

Destructive testing procedures which require the dissolution of paint include spectrophotometry in the visible and UV range and include wet chemical techniques. The wet chemical techniques include color tests for organic vehicles; gas analysis; acid-base color tests for organic pigments; color tests for ions; microsublimation of organic pigments; crystal tests for ions; sulfuric acid crystals of organic pigments; chromatography of ions, pigments and vehicles; organic solvent crystals of organic pigments; and electrophoresis of ions, pigments and vehicles.

Applicable techniques for evaluating pigments, vehicles, and paints are noted below.

With respect to pigments, (a) metallic ions in pigments can be evaluated with spectrography, neutron activation analysis, wet chemical techniques, and electron microprobe analysis, (b) x-ray diffraction analysis, wet chemical techniques, and microscopic examination can be used to evaluate crystal forms, (c) wet chemical techniques can be used to evaluate gas evolution and acid-base reactions, (d) spectrophotometry can be utilized to evaluate light absorption, and (e) radiation procedures can be utilized to evaluate fluorescence, infrared absorption, x-ray absorption, and luminescence, With respect to vehicles, (a) wet chemistry can be utilized to evaluate chemical reactions and solubility, (b) infrared spectrophotometry can be utilized to evaluate light absorption, and (c) gas chromatography and melting point examinations can be utilized to evaluate heat reactions.

With respect to paints, (a) x-ray diffraction analysis and microscopic examinations can be utilized to evaluation crystalline structure, (b) reflectance spectrophotometry and multiple reflectance IR spectrophotometry can be utilized to evaluate reflectance, (c) radiation procedures can be utilized to evaluate x-ray absorption, infrared absorption, luminescence, and fluorescence, (d) density gradient techniques can be utilized to evaluate specific gravity, (e) pyrolysis-gas chromatography, differential thermal analysis, and melting point examinations can be utilized to evaluate heat reactions, (f) and wet chemical techniques can be utilized to evaluate solubility.

While the foregoing prior art analysis techniques have all proven valuable to some extent in authenticating paintings and/or in forensic procedures for matching paint chips with the original source of the paint chips, there are long-standing disadvantages associated with many of the prior art techniques. First, many of the techniques require that paint samples be removed from a painting. Many owners of paintings, particularly valuable oil paintings, strongly resist damaging their paintings by removing paint samples. Second, many techniques will produce varying results depending on time and on the conditions to which the painting is subjected. For example, as is well known, reflectance spectrophotometry can be utilized to determine the percentage reflectance by a paint of selective wavelengths of monochromatic light. The results obtained over a range of wavelengths from 350 mu to 1000 mu can be plotted versus the percentage reflection and can thus be utilized to define paint. However, aging of pigments, creep of paint caused by gravity, and varying degrees of contamination of the paint sample including a protective varnish layer or other contaminant on or in the paint sample, can cause significant variance in reflectance with time. An individual wishing to conceal the provenance of a painting has various methods at his disposal to alter significantly the contour and/or reflectance of the surface of a painting.

Accordingly, it would be highly desirable to provide an improved apparatus and method which would, without requiring that a painting be damaged, establish with a high degree of certainty the provenance of a painting.

Therefore, it is a principal object of the invention to provide an improved method and apparatus for authenticating paintings.

A further object of the invention is to provide an improved method and apparatus for generating unique characterization data for a painting without damaging the painting.

Another object of the invention is to provide an improved method and apparatus for generating unique characterization data for a painting which will identify with a high degree of certainty the provenance of a painting even when the surface of the painting has been altered in a deliberate attempt to conceal the identity of the painting.

SUMMARY OF THE INVENTION

Briefly, in accordance with the invention, I provide improved apparatus for generating characterization data to identify a selected painting having a front viewing surface and a rear surface attached to a backing. The apparatus includes a system for generating during a first selected time period first reference data representing at least one two dimensional image in the selected painting; a system for generating during the first selected time period second reference data representing at least one physical characteristic of the front viewing surface of the selected painting and correlating the second reference with the first reference data to generate unique characterization data identifying the selected painting; a system for storing for recall the first reference data, the second reference data, and the unique characterization data; a system for during a second selected time period subsequent to the first selected time period generating first base data representing at least a single two dimensional image on a test painting which may be the selected painting, the test painting having a front viewing surface, the two dimensional image on the test painting being similar to the two dimensional image on the selected painting; and, a system for during the second selected time period generating second base data representing the physical characteristic of the front viewing surface of the test painting and correlating the second base data and the first base data to generate unique characterization data for the test painting. The apparatus also includes a system for recalling the first and second reference data and the unique characterization data for the selected painting and comparing the first reference data to the first base data, the second reference data to the second base data, and the unique characterization data for the selected painting to the unique characterization data for the test painting to determine if the test painting is the selected painting.

In a further embodiment of the invention, I provide an improved apparatus for generating characterization data to identify a selected painting having a front viewing surface and a rear surface attached to a backing. The apparatus includes a system for generating during a first selected time period first reference data representing the internal structure of the selected painting; a system for generating during the first selected time period second reference data representing at least one physical characteristic of the front viewing surface of the selected painting; a system for storing for recall the first reference data and the second reference data; a system for during a second selected time period subsequent to the first selected time period generating first base data representing the internal structure of a test painting which may be the selected painting, the test painting having a front viewing surface; and, a system for during the second selected time period generating second base data representing the physical characteristic of the front viewing surface of the test painting. The apparatus also includes a system for comparing the first reference data to the first base data and the second reference data to the second base data to determine if the test painting is the selected painting.

In another embodiment of the invention, I provide improved apparatus for generating characterization data to identify a selected painting. The apparatus includes a system for generating during a first selected time period first reference data representing at least a single two dimensional image in the selected painting; a system for generating during the first selected time period second reference data representing at least one physical characteristic of the internal structure of the selected painting and correlating the second reference data with the first reference data to generate unique characterization data identifying the selected painting; a system for storing for recall the first reference data, the second reference data, and the unique characterization data; a system for during a second selected time period subsequent to the first selected time period generating first base data representing at least one two dimensional image on a test painting which may be the selected painting, the two dimensional image on the test painting being similar to the two dimensional image on the selected painting; and, a system for during the second selected time period generating second base data representing the physical characteristic of the internal structure of the test painting and correlating the second base data and the first base data to generate unique characterization data for the test painting. The apparatus also includes a system for recalling the first and second reference data and the unique characterization data and comparing the first reference data to the first base data, the second reference data to the second base data, and the unique characterization data for the selected painting to the unique characterization data for the test painting to determine if the test painting is the selected painting.

In still a further embodiment of the invention, I provide apparatus for generating characterization data to identify a selected painting having a front viewing surface and a rear surface attached to a backing, including a system for generating during a first selected time period first reference data globally representing at least one physical characteristic of at least one of the pair comprising the front viewing surface of the selected painting and the internal structure of the selecting painting; a system for storing for recall the first reference data; a system for during a second selected time period subsequent to the first selected time period generating for a test painting which may be the selected painting first base data globally representing the physical characteristic of said one of the pair, the test painting having a front viewing surface; and, a system for recalling the first reference data and comparing the first reference data to the first base data to determine if the test painting is the selected painting.

BRIEF DESCRIPTION OF THE DRAWINGS

These and other, further and more specific objects and advantages of the invention will be apparent to those skilled in the art from the following detailed description thereof, taken in conjunction with the drawings, in which.

DESCRIPTION OF THE PREFERRED EMBODIMENTS

Figure 1:
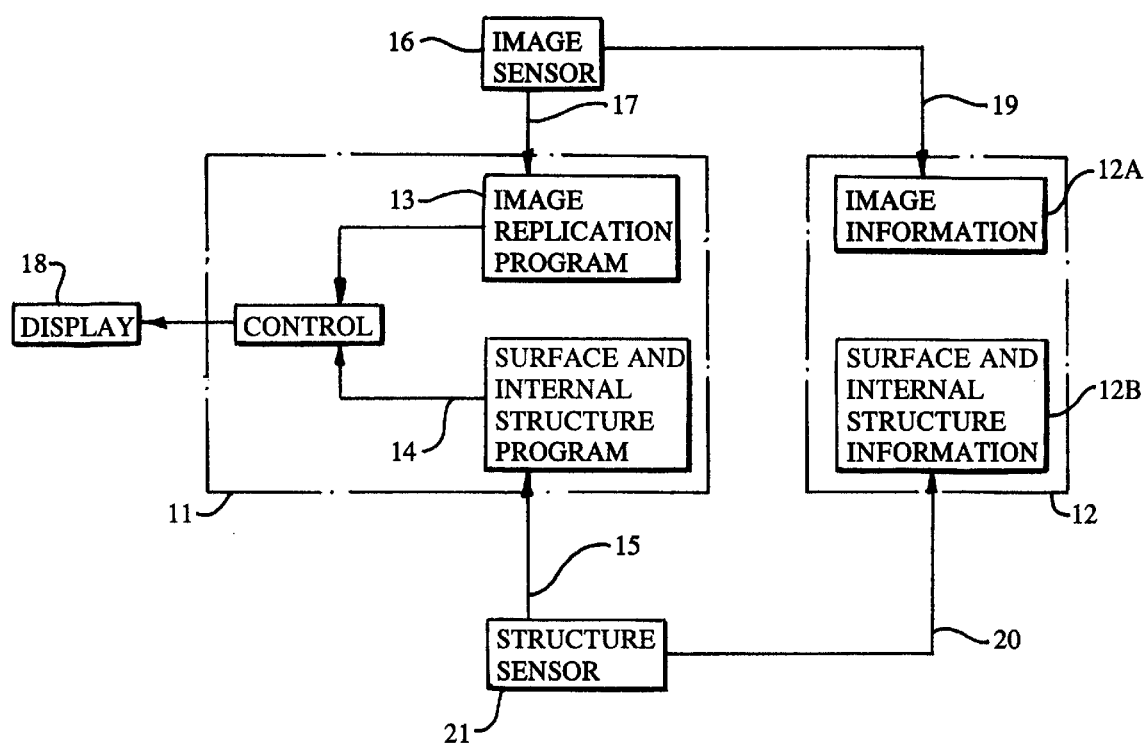
FIG. 1 is a block diagram illustrating an improved apparatus for generating unique characterization data for a painting in accordance with the principles of the invention; and, FIG. 2 is a block diagram which illustrates a typical program or logic function utilized in the apparatus of FIG. 1.

Turning now to the drawings, which depict the presently preferred embodiments of the invention for the purpose of illustrating the practice thereof and not by way of limitation of the scope of the invention, FIG. 1 illustrates apparatus for generating unique characterization data for a painting. The apparatus includes a controller 11 and a memory 12. Image sensor 16, structure sensor 21, and display 18 are provided. If desired, other data input (a keyboard, punched card reader, paper tape reader, optical scanner, etc.) and data output (a printer, visual display etc.) can be provided. Controller 11 includes a control, image replication program 13 and surface and internal structure program 14 sub-routines. Memory 12 includes image information 12A and surface and internal structure information 12B.

The controller 11 can be a digital computer, analog computer, hybrid computer, or other programmable apparatus. In practice, the very large majority of computers comprise digital computers.

The memory 12 can be any suitable prior art memory unit such as are commonly used in digital or other computers. For example, electromagnetic memories such as magnetic, optical, solid state, etc. or mechanical memories such as paper tape.

Structure sensor 21 provides 20 data to surface and internal structure information 12B, and provides 15 data to surface and internal structure program 14.

Image sensor 16 provides 19 data to image information 12A, and provides 17 data to surface and image replication program 13. As will be seen, the image information program 13 performs the functions of image definition and comparison. The surface and internal structure program 14 performs of the functions of structure definition and comparison. Image information 12A in memory 12 is utilized by image replication program 13. Surface and internal structure information 12B in memory 12 is utilized by surface and internal structure program 14.

The image information 12A included in memory 12 can vary as desired, but typically includes a two dimensional replication of at least one image in the selected painting. As used herein, an image is a global area of the subject matter depicted by a painting. A global area is one square inch or greater, preferably at least two square inches in size. Ordinarily, but not necessarily, the image will comprise a two dimensional replication of the entire subject matter of a painting. Further, the image ordinarily, but not necessarily, includes at least one person, place, or thing depicted by the painting. In contrast, some "modern art" paintings consist only of discrete discernable areas of differing color which do not define any discernable person, place, or thing.

The replication of the image can comprise a color photograph of the selected global area. A black and white photograph can be utilized. While the photograph can be in the form of a conventional print, it is preferred that a replication of an image in a selected painting be produced by digitally scanning the painting into the image information 12A in the memory of a computer. It is felt critical that the dimensions of the image from the selected painting be included in information 12B so that the location, size, and dimensions of each object, color, internal structure, etc. can be accurately spatially determined in two dimensions, i.e., the location of each point comprising the image can be defined with an x-coordinate and a y-coordinate. The image information 12A and surface and internal structure information 12B for the selected painting ordinarily are generated either contemporaneously or within a reasonable period of time of less than a year, preferably less than one month, to establish the validity of a claim that information 12A and 12B both pertain to the selected painting.

Apparatus for making photographs of a painting and for digitally scanning a painting into the memory of a computer are well known and such will not be detailed herein.

As used herein, a painting comprises a surface coated with paint. While the invention can be utilized in connection with any type of painting, one of the primary areas of utilization of the invention is in connection with oil paintings. The paint in a painting has a front, or viewing, surface which is seen by an observer. The paint also has a back surface which normally is obscured from view and is secured to a canvas or other backing. The paint can include one or more layers.

The surface and internal structure information 12B included in memory 12 can vary as desired, but typically includes either a physical property of the viewing surface of a selected painting or of the internal structure of a selected painting. By way of example, and not limitation, one physical property of the viewing surface of a selected painting (or test painting) is the reflectance of the surface. The reflectance is determined at a point(s) on the viewing surface the location of which corresponds to a point in the image replicated in memory 12A. The two dimensional spatial location of the point in the global area of the replicated image is known, as is the two dimensional spatial location of the point at which the reflectance is determined. In determining the reflectance at a point on the viewing surface, a spectrophotometer can be utilized which separates the light reflected from the plaint into its various wavelengths and measures the intensity of each wavelength of light. The intensity of each wavelength of light detected at one or more points on the viewing surface of a painting can be plotted on graph paper or can be maintained in some other memory. It is, however, presently preferred that the intensity of each wavelength of light simply be maintained digitally in the memory 12B of a computer. A physical property like reflectance is globally determined when it is determined at a plurality of locations on a painting. Other examples of physical properties of the view surface are, without limitation, density, chemical composition, hardness, moisture content, porosity, elasticity, particle size, and pigment types.

Another example of a physical property of the viewing surface of a selected painting is the topography of the viewing surface of the selected painting. Photogrammetry can be utilized to produce a topographical map of all or a portion of the viewing surface. Photogrammetry is utilized to determine the contour of a painting at points on the viewing surface each having a location which corresponds to the location of a point in the image replicated in memory 12A. The two dimensional spatial location of each of the points in the global area of the replicated image is known, as is the two dimensional spatial location of the points at which the reflectance is determined. The topographical map can be retained in memory by plotting the map on a piece of paper. It is, as was the case with the reflectance wavelengths noted above, presently preferred to retain the topographical map in digitized form in the memory 12B of a digital computer. Although photogrammetry techniques may not have been utilized in connection with paintings, such techniques are well known in the art, can be readily applied to prepare a topographical map of a painting, and will not be detailed herein. Photogrammetry is a preferred technique because it produce a series of photographs which can be digitally stored and which are useful in determining at a later date if a test painting corresponds to the photographs taken earlier of a selected original painting.

Regardless of the physical property which is selected and measured with respect to the viewing surface of a painting, it is important that the exact location on the viewing surface be maintained in memory 12B so that each physical property measurement and the point on the painting at which the measurement is made can be correlated with a corresponding point in the two dimensional replication of the image which is depicted by the selected painting and which is retained in memory 12A. The prior art is replete with literally hundreds of techniques for testing paintings. Much, if not all, of information gained by such tests is not correlated to increase greatly the likelihood that the information can be utilized to properly identify or authenticate a painting. One preferred correlation utilized in the practice of the invention is correlating a specific reference point in an image in a painting (said image being replicated in memory 12A) with the physical property found either at the corresponding point on the viewing surface or at a point in the internal structure which is directly beneath the reference point. For example, if a particular reflectance or contour value initially correlates with (i.e., is located at) a point in the image of a painting which is located precisely at the end of a person's nose depicted in the painting, and the reflectance or contour value cannot later be found at that particular point on a test painting which purports to be the selected painting, this is more useful than simply a plotting of various reflectance or contour values for a painting.

Another preferred correlation utilized in the practice of the invention is correlating a physical property of the viewing surface of a painting at a selected reference point or spatial location in an image with the internal structure of the painting immediately below said selected reference point. If, for example, a particular reflectance value and particular internal structure (such as the thickness of an intermediate paint layer) occurs at a point located precisely at the end of a person's nose depicted in the painting, and that particular reflectance value and internal structure cannot later be found at that particular point on a test painting which purports to be the selected painting, this is a useful procedure for verifying the provenance of the test painting.

Computerized tomography is one process which can be utilized in accordance with the invention to obtain information concerning the internal structure of a painting. Computerized tomography analyzes the attenuation and velocity of wave packets as they pass through voxels in an object. Computerized tomography can produce extremely fine spatial resolution of the internal structure of an object. The internal structure of the object can be stored in digital form in memory 12B.

In addition, radiographs can detect internal differences in density and thickness and can help construct the process an artist used to make a painting. A radiograph can also compare the size of particles in and the radiopacity of areas in a painting. Physical properties of the internal structure of a painting can include, without limitation, density, chemical composition, hardness, moisture content, porosity, elasticity, particle size, and pigment types.

Figure 2:
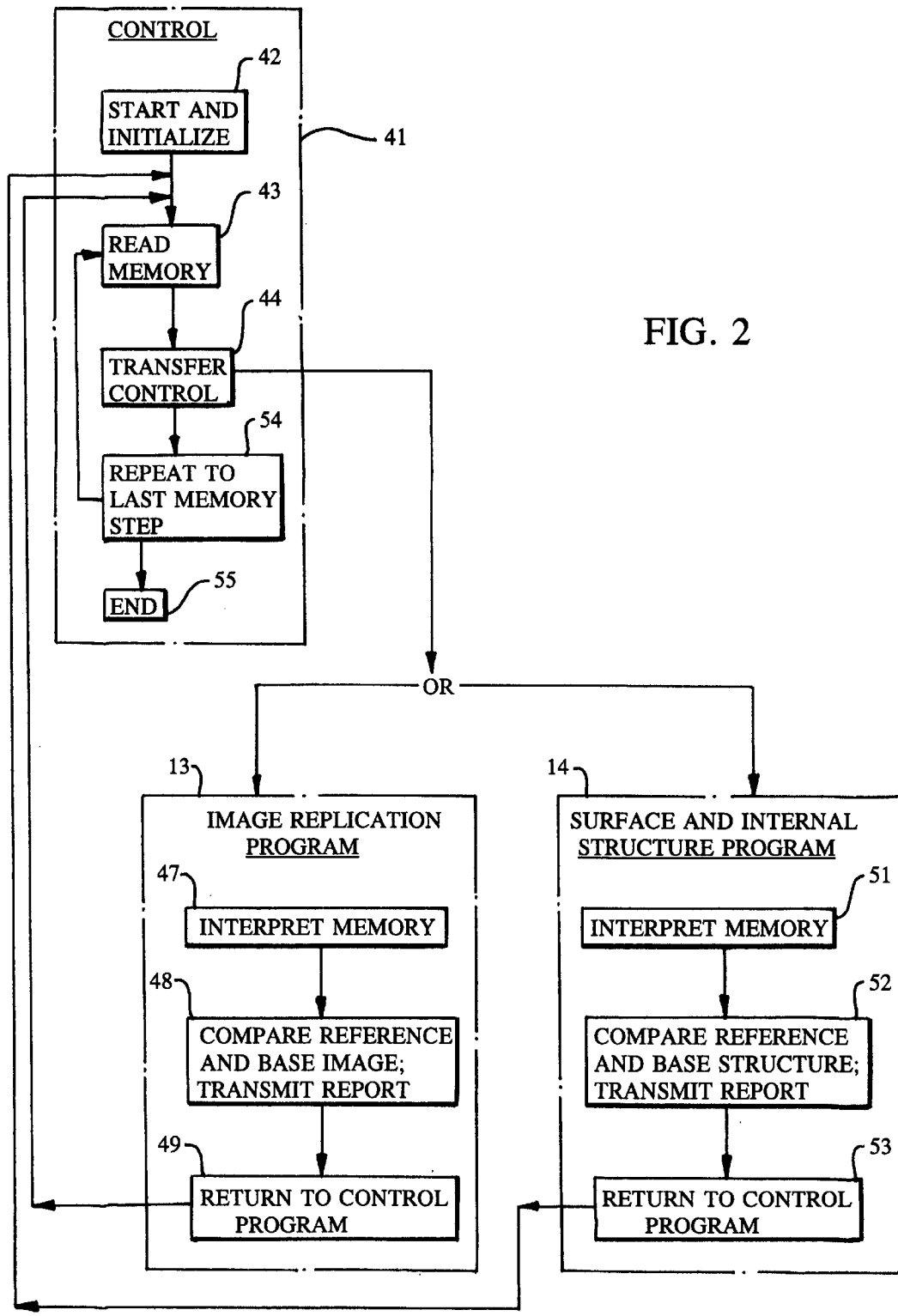

FIG. 2 is a block flow diagram which illustrates a typical program or logic function which is executed by the controller 11. The basic control program 41 consists of commands to "start and initialize" 42, "read memory" 43 and "transfer control" 44 to either the image replication program sub-routine 13 or the surface and internal structure program sub-routine 14.

The image replication program sub-routine 13 consists of commands to "interpret memory" 47, "compare reference image and base image and transmit report" 48, and "return to control program" 49. The "surface and internal structure program" sub-routine 14 consists of commands to "interpret memory" 51, "compare reference and base structure and transmit report" 52, followed by "return to control program" 53. The control program 41 repeats the image replication program 13 and surface and internal structure program 14 sub-routines as indicated by the "repeat to last memory step" 54 of the control program 41 followed by an "end" program step 55 which completes the execution of the program.

EXAMPLE

An original oil painting is selected. The painting was completed in the early 1900's and depicts a French poacher walking in the woods and carrying a rifle. Image sensor 16 (a scanner) is utilized to input 19 a digital two dimensional reference replication of the entire painting into image information 12A. The reference image replicated in memory 12A comprises the entire subject matter of the painting. The digital reference replication includes an accurate measurement of the dimensions of the painting and, accordingly, of the poacher, gun and other objects depicted in the painting. The spatial location (coordinates) of each reference point in the reference image replicated in memory 12A is known.

A reflectance spectrophotometer is utilized as a structure sensor 21 to produce globally a reference reflectance reading at each of a plurality of selected reference locations or points on the viewing surface of the painting. This reference reflectance data is digitally input by sensor 21 into memory 12B. The spatial coordinates of each selected reference location or point on the viewing surface of the painting are known and correspond to a point in the reference image replicated in memory 12A. The reference reflectance data for each reference point or location is correlated to associated with the corresponding reference point or location in the image replicated in memory 12A. Consequently, if the reference image includes a depiction of a person's nose, if a reference point at the very tip of the person's nose has the spatial coordinates of 4.52 inches/and 6.10 inches (i.e., the horizontal coordinate of the reference point is 4.52 inches from the center of the painting and the vertical coordinate of the reference point is 6.10 inches from the center of the painting), and if a reference reflectance value is determined at a point having the coordinates 4.52 inches/6.10 inches, then the specific location of the reference reflectance value in the image is known.

Photogrammetry equipment is utilized as a sensor 21 to generate a reference topographical chart of the entire viewing surface of the painting. The information embodied in the reference topographical chart is digitized and stored in memory 12B. The contour value or "height" at each reference point on the viewing surface of the entire painting is known. The spatial coordinates of each reference point on the viewing surface are known and correspond to a reference point in the reference image replicated in memory 12A. The reference topographical or contour data for each reference point or location is correlated to and associated with the corresponding reference point or location in the image replicated in memory 12A. Consequently, if the reference image in memory 12A includes a depiction of a person's nose, if a reference point at the very tip of the person's nose has the spatial coordinates of 4.52 inches/and 6.10 inches (i.e., the horizontal coordinate of the point is 4.52 inches from the center of the painting and the vertical coordinate of the point is 6.10 inches from the center of the painting), and if a reference contour value is determined at a reference point having the coordinates 4.52 inches/6.10 inches, then the specific location of the reference contour value in the reference image is known.

Computerized tomography equipment is utilized as yet another sensor 21 to generate reference data concerning the internal structure of the entire painting. This internal structure reference data is digitized and stored in memory 12B. The internal structure directly beneath each point on the viewing surface of the painting is known. The spatial coordinates of each point on the viewing surface are, as noted, known. Consequently, if the reference image includes a depiction of a person's nose, if a reference point at the very tip of the person's nose has the spatial coordinates of 4.52 inches/and 6.10 inches (i.e., the horizontal coordinate of the point is 4.52 inches from the center of the painting and the vertical coordinate of the point is 6.10 inches from the center of the painting), and if the internal structure reference data is determined at a point having the coordinates 4.52 inches/ 6.10 inches, then the specific location of the internal structure reference data in the reference image is known.

Subsequent to the generation and storage of the aforementioned digitized information in this example, a test painting is brought forth. It is claimed that the test painting is the actual selected painting from which the aforementioned digitized information was produced. The test painting is an oil painting and appears very similar to the original oil painting.

Image sensor 16 (a scanner) is utilized to input 19 a digital two dimensional base replication of the entire test painting into image information 12A. The base image replicated in memory 12A comprises the entire subject matter of the test painting. The digital replication of the base image includes an accurate measurement of the dimensions of the test painting and, accordingly, of the poacher, gun and other objects depicted in the test painting. The spatial location (coordinates) of each base point in the base image replicated in memory 12A for the test painting is known.

A reflectance spectrophotometer is utilized as a structure sensor 21 to produce globally a base reflectance reading at each of a plurality of selected reference locations or points on the viewing surface of the test painting. The selected reference points on the test painting correspond to the reference points selected on the original painting to generate reference reflectance values. The base reflectance data for the test painting is digitally input by sensor 21 into memory 12B. The spatial coordinates of each selected base reference location or point on the viewing surface of the test painting are known and correspond to a base point in the base image replicated in memory 12A. The base reflectance data for each base reference point or location is correlated to and associated with the corresponding base point or location in the base image replicated in memory 12A for the test painting. Consequently, if the base image of the test painting includes a depiction of a person's nose, if a base point at the very tip of the person's nose has the spatial coordinates of 4.52 inches/and 6.10 inches (i.e., the horizontal coordinate of the point is 4.52 inches from the center of the test painting and the vertical coordinate of the point is 6.10 inches from the center of the test painting), and if a base reflectance value is determined at a base point having the coordinates 4.52 inches/6.10 inches, then the specific location of the base reflectance value in the base image is known.

Photogrammetry equipment is utilized as a sensor 21 to generate a topographical chart of the entire viewing surface of the test painting. The information embodied in the base topographical chart is digitized and stored in memory 12B. The contour value or "height" at each base point on the viewing surface of the entire test painting is known. The spatial coordinates of each base point on the viewing surface of the test painting are known and correspond to a base point in the base image replicated in memory 12A. The base contour data for each base point or location is correlated to and associated with the corresponding base point or location in the base image replicated in memory 12A. Consequently, if the base image includes a depiction of a person's nose, if a point at the very tip of the person's nose has the spatial coordinates of 4.52 inches/and 6.10 inches (i.e., the horizontal coordinate of the point is 4.52 inches from the center of the test painting and the vertical coordinate of the point is 6.10 inches from the center of the test painting), and if a base contour value is determined at a base point having the coordinates 4.52 inches/6.10 inches, then the specific location of the base contour value in the base image is known.

Computerized tomography equipment is utilized as yet another sensor 21 to generate data concerning the internal structure of the entire test painting. This base internal structure data is digitized and stored in memory 12B. The base internal structure directly beneath each base point on the viewing surface of the test painting is known. The spatial coordinates of each point on the viewing surface are, as noted, known. Consequently, if the base image includes a depiction of a person's nose, if a point at the very tip of the person's nose has the spatial coordinates of 4.52 inches/and 6.10 inches (i.e., the horizontal coordinate of the point is 4.52 inches from the center of the painting and the vertical coordinate of the point is 6.10 inches from the center of the painting), and if the base internal structure is determined at a base point having the coordinates 4.52 inches/6.10 inches, then the specific location of the base internal structure in the base image is known.

Controller 11 digitally compares the reference image of the original painting to the base image of the test painting. The outer length and width and the shape and dimension of the hunter and gun in the base image of the test painting are identical to the outer length and width and the shape and dimension of the hunter and gun in the reference image of the original oil painting to within a selected variance of plus or minus one percent. The selected permissible variance used to determine whether the test painting is the original painting can, in the practice of the invention, be varied as desired.

Controller 11 digitally compares the base reflectance reading at each base point in the test painting with reference reflectance readings at each identical or corresponding reference point in the original oil painting. The reflectance readings are identical to within a variance of plus or minus three percent. The selected permissible variance used to determine whether the test painting is the original painting can, in the practice of the invention, be varied as desired.

Controller 11 digitally compares the base photogrammetric topographical map of the test painting with the reference photogrammetric topographical map of the original oil painting. The base contour value at a selected base point is compared to the reference contour value at an identical or corresponding reference point. The base contour values are identical to the reference contour values within a variance of plus or minus two percent. The selected permissible variance used to determine whether the test painting is the original painting can, in the practice of the invention, be varied as desired.

Controller 11 digitally compares the base tomographical internal structure of the test painting with the reference tomographical internal structure of the original oil painting. The base internal structure of the test painting is, within a variance of plus or minus two percent, identical to the reference internal structure of the original oil painting. The selected permissible variance used to determine whether the test painting is the original painting can, in the practice of the invention, be varied as desired.

Based on its above-described digital comparison of the test painting and the original oil painting, the controller 11 determines that the test painting is in fact the original oil painting. Controller 11 transmits its findings to display 18 in the form of a report which appears on display 18.

In another embodiment of the invention, a plurality of paintings by the same painter are analyzed to produce surface and internal structure information. The surface and internal structure information are then analyzed to determine if there are characteristics common to each painting prepared by the painter, by the painter's student, and/or by imitators of the painter. For example, the paintings produced by one painter may have a rough surface contour such that the differential between the lowest point on the viewing surface of the painting and the highest point on the viewing surface of the painting is always greater than 3.0 millimeters. Another painter may produce paintings which have smooth, level surfaces such that the differential between low and high points on the viewing surface is less than 0.5 mm. Once a particular characteristic(s) is identified for a particular painter, this characteristic can be considered in determining whether other paintings could have been authored by that particular painter.

Having described my invention in such terms as to enable those skilled in the art to understand and practice it, and having described the presently preferred embodiments thereof, I claim:

1. Apparatus for generating characterization data to identify a selected painting having a front viewing surface and a rear surface attached to a backing, including
   (a) means for generating during a first selected time period first reference data representing at least one two dimensional image in the selected painting;
   (b) means for generating during said first selected time period second reference data representing at least one physical characteristic of the front viewing surface of the selected painting and correlating said second reference with said first reference data to generate unique characterization data identifying the selected painting;
   (c) means for storing for recall said first reference data, said second reference data, and said unique characterization data;
   (d) means for during a second selected time period subsequent to said first selected time period generating first base data representing at least one two dimensional image on a test painting said test painting having a front viewing surface, said two dimensional image on said test painting being similar to said two dimensional image on the selected painting;
   (e) means for during said second selected time period
      (i) generating second base data representing said physical characteristic of the front viewing surface of said test painting and correlating said second base data and said first base data to generate unique characterization data for said test painting, and
      (ii) recalling said first and second reference data and comparing said first reference data to said first base data, said second reference data to said second base data, and said unique characterization data for the selected painting to said unique characterization data for the test painting to determine if said test painting is the selected painting.

2. Apparatus for generating characterization data to identify a selected painting having a front viewing surface and a rear surface attached to a backing, including
   (a) means for generating during a first selected time period first reference data representing the internal structure of the selected painting;
   (b) means for generating during said first selected time period second reference data representing at least one physical characteristic of the front viewing surface of the selected painting;
   (c) means for storing for recall said first reference data and said second reference data;
   (d) means for during a second selected time period subsequent to said first selected time period generating first base data representing the internal structure on a test painting, said test painting having a front viewing surface;
   (e) means for during said second selected time period
      (i) generating second base data representing said physical characteristic of the front viewing surface of said test painting, and
      (ii) comparing said first reference data to said first base data and said second reference data to said second base data to determine if said test painting is the selected painting.

3. Apparatus for generating characterization data to identify a selected painting, including
   (a) means for generating during a first selected time period first reference data representing at least one two dimensional image in the selected painting;
   (b) means for generating during said first selected time period second reference data representing at least one physical characteristic of the internal structure of the selected painting and correlating said second reference with said first reference data to generate unique characterization data identifying the selected painting;
   (c) means for storing for recall said first reference data, said second reference data, and said unique characterization data;
   (d) means for during a second selected time period subsequent to said first selected time period generating first base data representing at least one two dimensional image on a test painting, said two dimensional image on said test painting being similar to said two dimensional image on the selected painting;
   (e) means for during said second selected time period
      (i) generating second base data representing said physical characteristic of the internal structure of said test painting and correlating said second base data and said first base data to generate unique characterization data for said test painting, and
      (ii) recalling said first and second reference data and comparing said first reference data to said first base data, said second reference data to said second base data, and said unique characterization data for the selected painting to said unique characterization data for the test painting to determine if said test painting is the selected painting.

* * * * *